Oct. 28, 1969     R. E. NELSON     3,475,076

FIBER OPTIC WINDOW AND METHOD OF MOUNTING SAME

Filed May 10, 1967

WITNESSES

INVENTOR
Robert E. Nelson
BY Charles P. Perry
ATTORNEY

United States Patent Office 3,475,076
Patented Oct. 28, 1969

3,475,076
FIBER OPTIC WINDOW AND METHOD OF MOUNTING SAME
Robert E. Nelson, Horseheads, N.Y., assignor to Westinghouse Electric Corporation, Pittsburgh, Pa., a corporation of Pennsylvania
Filed May 10, 1967, Ser. No. 637,420
Int. Cl. G02b 5/14; G02f 5/00
U.S. Cl. 350—96                                                     4 Claims

ABSTRACT OF THE DISCLOSURE

This invention relates to means and methods of mounting a fiber optic window within an evacuated envelope. A support flange, surrounding said fiber optic window, is provided with an inturned flange portion having an upturned lip portion and on which one face of the fiber optics face plate rests after sealing. The flange and the fiber optic window are of suitable matching coefficient of expansion materials and are provided with a suitable coefficient of matching glass frit material between at least the inturned portion of the flange and the face of the fiber optic window. The upturned lip portion provides a control for the window after firing of the frit to provide a height and parallelism stop for the fiber optic window. The lip portion also provides control of the amount and shape of the extruded frit.

Background of the invention

This invention relates to means and methods of providing a fiber optic window in an evacuated envelope. In United States Patent 3,226,589, several structures are described for providing a fiber optic window in an evacuated envelope. In this above patent, the fiber optic window is sealed or fused to the glass envelope without any intermediate metallic portion. It is also known in the art to utilize a metallic flange sealed to the fiber optic window between the fiber optic window and the main envelope portion. This type of seal is normally provided by providing a flange member having an inwardly directed flange portion which was parallel to the plane of one face of the fiber optic plate. It was necessary in this prior art to provide a fixture for the seal assembly in which support was provided for the fiber optic window on one face of the window and also for the flange member. There was no control over the amount or shape of frit that might be extruded from between the surface of the fiber optic window and the substantially parallel portion of the flange member. This flow of frit caused either void re-entrant portions between the flange and the fiber optic or projecting portions of frit. The removal of the excess projecting portions of frit by grinding operation was difficult, especially in avoiding optic damage or breakage of the vacuum-tight seal. The re-entrant type configuration resulted in the seal being more susceptible to breakage and also resulted in difficulty in providing a clean tube. The spacing of the fiber optic window for height and parallelism was also controlled by the fixturing equipment and required constant close control to minimize damage to the fiber optic window from contact with the fixture.

It is, accordingly, a general object of this invention to provide an improved structure and method of fabricating support means for a fiber optic face plate within an evacuated envelope.

Briefly, the present invention provides a metallic flange for supporting the fiber optic window in which the window rests, after sealing, on an upturned lip portion provided on an inwardly projecting flange portion. The window is fabricated by providing glass frit within the region of the inwardly projecting flange with associated lip portion which provides a channel and into and above the frit material as provided in the green state. The window is then positioned on this green frit and then fired which permits the window by gravity to move downwardly through the viscous frit into contact with the lip and thereby providing a vacuum-tight seal between the window and the inwardly projecting flange.

Further objects and advantages of this invention will become apparent as the following description proceeds and features of novelty which characterize the invention will be pointed out in particularity in the claims annexed to and forming a part of this specification.

Brief description of the drawing

For a better understanding of the invention, reference may be had to the accompanying drawings, in which.

Description of the preferred embodiment

Figure 1:
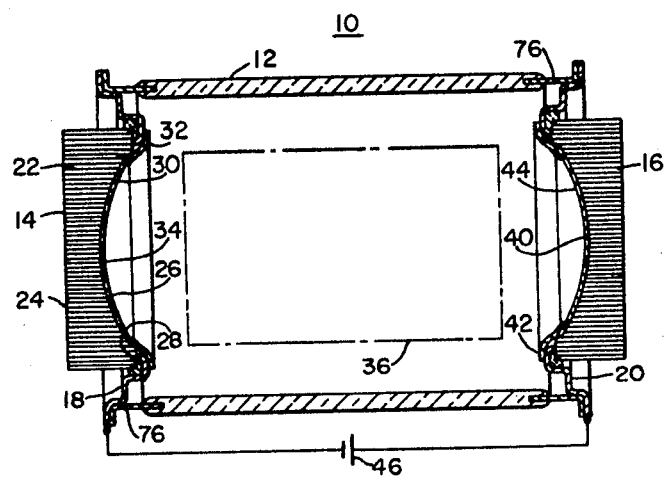
FIG. 1 is an elevation view, partly in section, of an image intensifier sealed in accordance with the teachings of this invention.

Referring in detail to FIG. 1, an image intensifier tube is shown incorporating fiber optic windows in accordance with the teachings of this invention. The tube includes an envelope 10 which is comprised of a cylindrical portion 12 of a suitable material such as glass with fiber optic face plates 14 and 16 provided at opposite ends of the cylindrical portion 12. Flange members 18 and 20 secure the windows 14 and 16, respectively, to the envelope portion 12.

The input fiber optic face plate 14 consists of glass fibers 22 having a core portion of a suitable material such as optical flint glass with a cladding of soda lime or potash soda lead glass with the individual fibers 22 secured together to provide the face plate 14. A suitable material for the fiber optic windows 14 and 16 is described in more detail in the previously mentioned patent. The fiber optic face plate 14 is provided with a first face 24 which is substantially in one plane and perpendicular to the longitudinal axis of the envelope 10. The opposite or second face 26 of the window 14 has an outer peripheral or annular portion 28 substantially parallel to the first face 24 and also an inner concave portion 30. The inner concave portion 30 is provided for optical reasons. A photoemissive coating 34 of suitable material such as an S-20 multi-alkali material is provided on the inner surface 26. In the specific device shown, an electrically conductive annular coating 32 is provided between the photoemissive coating 34 and the flange member 18. The input light directed onto the photoemissive coating 34 excites photoelectrons which are emitted therefrom and accelerated to an output window 16. A suitable lens system 36 may be provided between the input window 14 and the output window 16 for focusing the electrons in a well known manner.

The output window 16 is similar to input window 14 and is provided with a concave portion surface 40 on the inner surface thereof and a suitable electron responsive phosphor coating 44 is provided on the surface 40. A suitable phosphor is a P-20 such as zinc cadmium sulfide-silver activated. A conductive coating 42 is provided over the phosphor coating 44 and is in electrical contact with flange 20. A suitable potential is provided between the conductive coatings 32 and 42 by means of a suitable source 46 illustrated as a battery. The potential from source 46 accelerates the electrons emitted from the photoemissive coating 34 in response to input light excitation into bombardment with the phosphor coating 44 on the output window 16. The electron excitation of phosphor coating 44 creates an amplified light image corresponding to the input light excitation.

Figure 2:
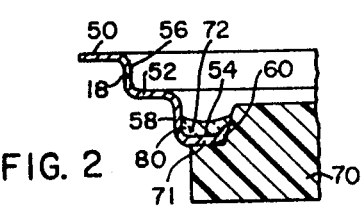
FIGS. 2-5 are sectional views illustrating various stages in the fabrication of the seal in accordance with the teachings of this invention.
Figure 3:
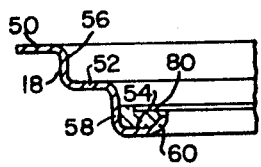

Referring now to FIGS. 2, 3, 4 and 5, there are illustrated various stages in the fabrication of the window seal. In that the seals at input window 14 and output window 16 are of similar nature, this description will be limited to the input window 14. The flange member 18 has a thickness of about .020 inch and a step-like cross-section, as illustrated in FIG. 2. The flange member may be of a suitable conductive material such as Carpenter 49, an alloy of about 49% nickel and 51% iron. The flange member 18 consists of an outer step portion 50, a central step portion 52 and an inner step portion 54. Riser portions 56 and 58 are provided between step portions 50 and 52 and set portions 52 and 54, respectively. The inner step portion 54 is also provided with an inner upturned lip portion 60. The portions 50, 56, 52 and 58 may be referred to as the body portion. The flange member 18 is mounted on a suitable fixture 70 which has an outer peripheral step-down portion 71 and on which the flange member 18 is positioned as illustrated in FIG. 2. A suitable glass frit powder and vehicle such as Corning frit 7575 with a vehicle of amyl acetate and a binder of nitrocellulose of syrupy consistency is then poured into the flange member 18, as illustrated in FIG. 2, so as to fill a channel 72 defined by the riser portion 58, the step portion 54 and the lip portion 60. The frit suspension 80 extends above the lip portion 60 and is confined by the fixture 70. The flange member 18 may then be removed after drying from the fixture 70 and with a suitable shaping tool excess frit material may be removed so as to provide a cross-section as illustrated in FIG. 3. The upturned lip portion 60 provides a gauge for determining the height of the glass frit remaining on the channel 72.

Figure 4:
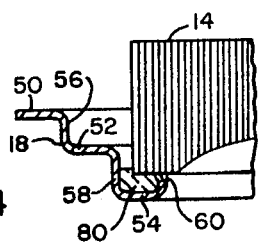
Figure 5:
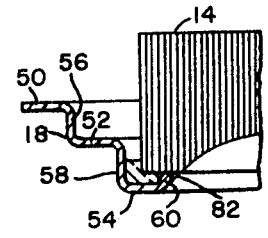

The window 14 is then positioned onto the glass frit fill portion 80 in channel 72, as illustrated in FIG. 4, and then placed in a suitable furnace for firing at a temperature of about 470° C. After firing, the frit is devitrified forming a configuration, as illustrated in FIG. 5, and is the finished product, as illustrated in FIG. 1. This provides essentially a butt seal. The process eliminates the need for contacting the inner face 26 of the window 14 with a fixture or exposing it to contamination by requiring positioning of the face 26 upward during sealing.

By this process, it is found that the shape of the finished extruded frit can be controlled to provide a base for the conductive coatings 32 and 42 and without difficulties of prior art. The result is a small smooth fillet 82 between the metallic flange 18 and the window 14. The flange portion 18 may be secured to the envelope portion 12 by any suitable sealing technique. Extensions 76 of a suitable material such as Kovar alloy are sealed to the glass envelope 12 and the flange 18 may be heliarc welded to the extension 76.

Various modifications may be made within the spirit of this invention.

I claim as my invention:

1. The method of securing a fiber optics window to an envelope comprising providing a metallic annular flange member having a coefficient of expansion similar to said fiber optics window, said flange member having a body portion having an inturned portion with an upturned lip portion and defining a channel between said lip portion and said body portion, comprising the steps of positioning said flange member on a fixture in a horizontal plane and introducing a glass frit suspension in said channel to above said lip portion, drying said frit, shaping said frit to provide a surface above said lip portion, removing said flange member from said fixture and positioning said fiber optic window upon said surface of said frit and above said lip portion and heating said assembly so that said frit material becomes viscous permitting said window to settle to said lip portion and provide a vacuum tight seal between said lip portion and said fiber optics window.

2. The method of claim 1 in which the step of heating said assembly so that said frit material becomes viscous causes said window to settle by gravity and extrudes said frit material to form a fillet on said fiber optic window at a point adjacent said lip portion.

3. A fiber optics window structure comprising an annular metallic flange member having a coefficient of expansion similar to said fiber optics window, said flange member having a body portion, said body portion having an inturned portion with an upturned lip portion and defining a channel between said lip portion and said body portion, the inner surface of said fiber optics window positioned on said lip portion and a glass frit material sealing said window to said flange member, said frit material including a first portion filling said channel and sealed to said inner surface of said window on an outer portion thereof surrounding said lip portion and a second portion providing a fillet portion on an inner portion within said lip portion and adjacent said lip portion.

4. The fiber optics window structure defined in claim 3 and including an electrically conductive coating contacting said flange and covering said fillet portion.

References Cited

UNITED STATES PATENTS 3,226,589   12/1965   Woodcock.
3,244,921   4/1966   Behun.

DAVID H. RUBIN, Primary Examiner

U.S. Cl. X.R.

65—43, 59; 250—213; 313—89, 94; 350—319, 320